(No Model.)

3 Sheets—Sheet 1.

J. LUXEM.
FANNING MILL.

No. 329,401. Patented Oct. 27, 1885.

(No Model.) 3 Sheets—Sheet 2.

J. LUXEM.
FANNING MILL.

No. 329,401. Patented Oct. 27, 1885.

Witnesses: E. G. Asmus, R. Platz

Inventor: Jacob Luxem
By Stout & Underwood
Attorneys.

(No Model.) 3 Sheets—Sheet 3.

J. LUXEM.
FANNING MILL.

No. 329,401. Patented Oct. 27, 1885.

Witnesses:
E. G. Asmus
N. E. Oliphant

Inventor:
Jacob Luxem
By Stout & Underwood
Attorneys.

(No Model.) 3 Sheets—Sheet 3.

J. LUXEM.
FANNING MILL.

No. 329,401. Patented Oct. 27, 1885.

Witnesses:
E. G. Asmus
N. E. Oliphant

Inventor:
Jacob Luxem
By Stout & Underwood
Attorneys.

UNITED STATES PATENT OFFICE.

JACOB LUXEM, OF RACINE, WISCONSIN.

FANNING-MILL.

SPECIFICATION forming part of Letters Patent No. 329,401, dated October 27, 1885.

Application filed December 1, 1884. Serial No. 149,188. (No model.)

*To all whom it may concern:*

Be it known that I, JACOB LUXEM, of Racine, in the county of Racine, and in the State of Wisconsin, have invented certain new and useful Improvements in Fanning-Mills; and I do hereby declare that the following is a full, clear, and exact description thereof.

My invention relates to fanning-mills, and is designed as an improvement in the machine described in the specification forming part of Letters Patent No. 267,699, granted to me November 21, 1882; and it consists in peculiarities of construction and combinations of parts, as will be more fully described and claimed hereinafter.

Figure 1:
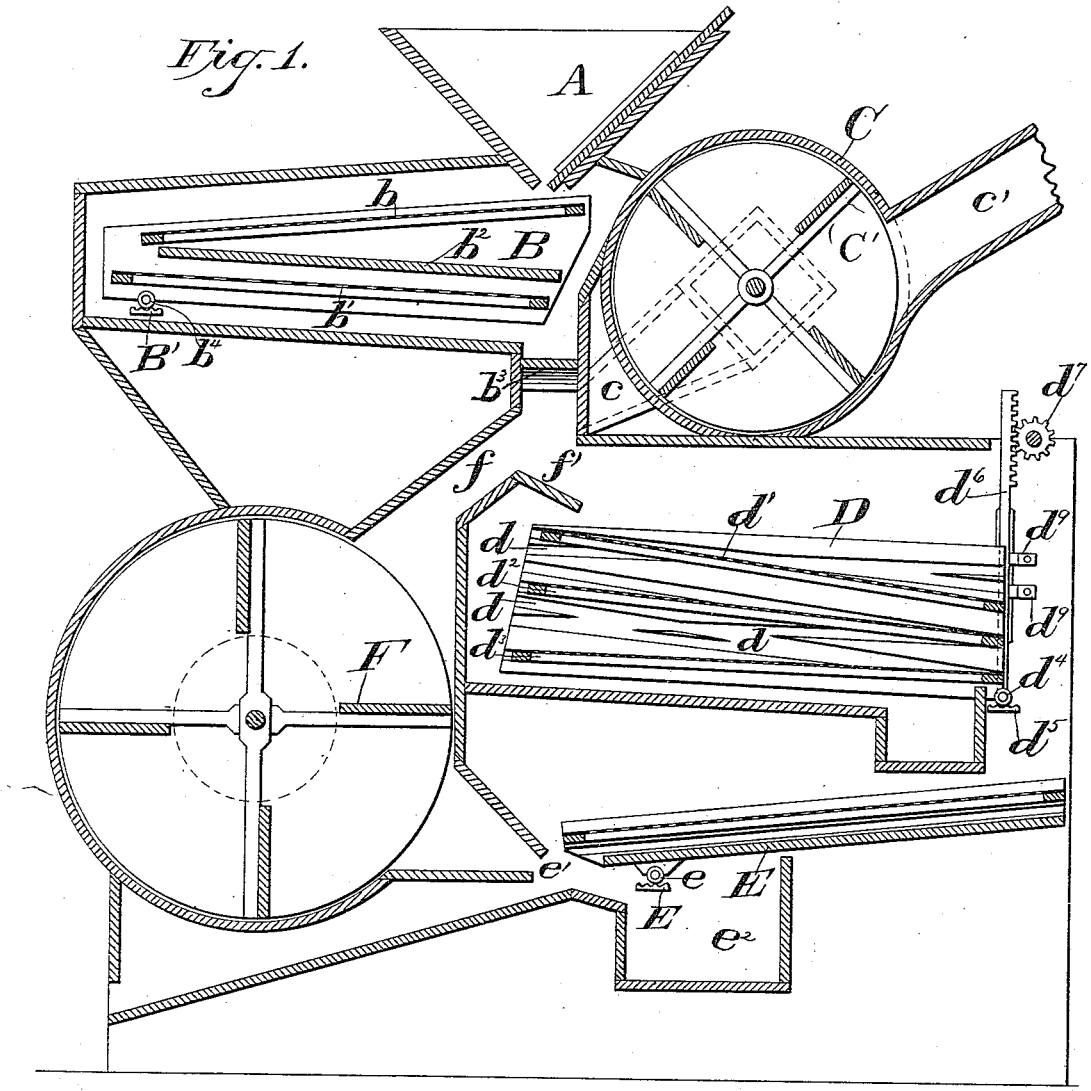
Figure 2:
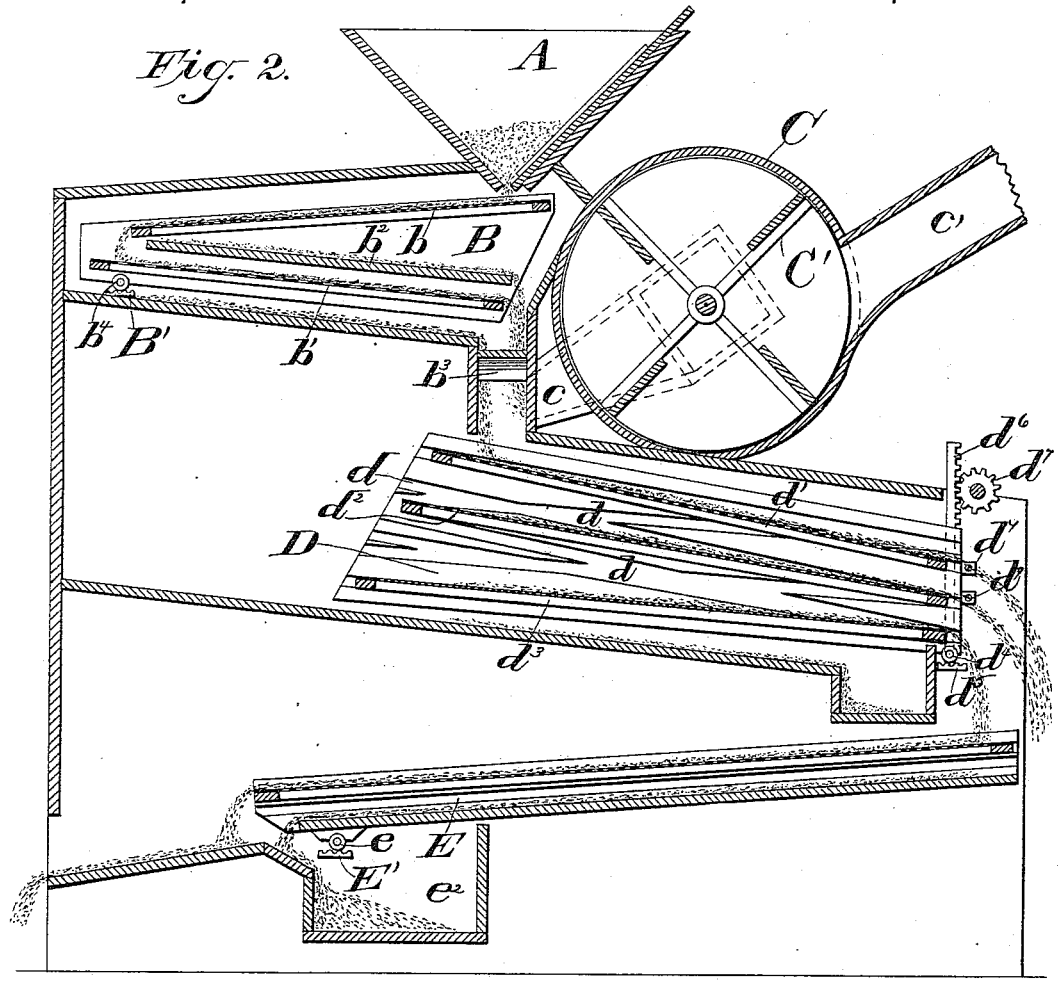
Figure 3:
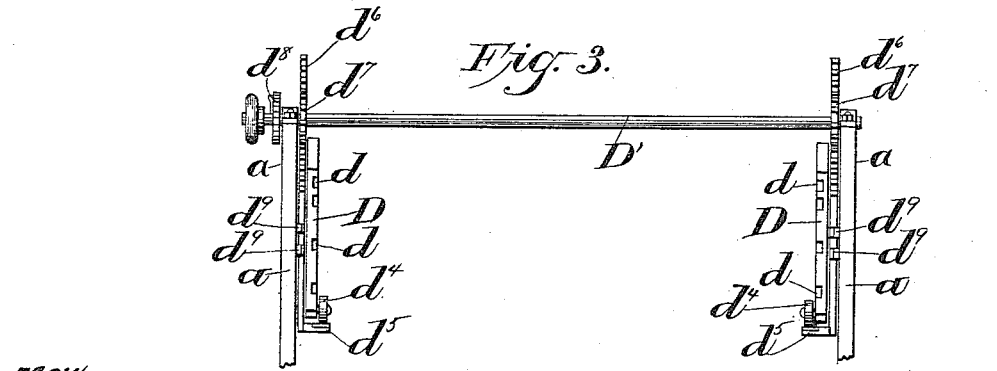
Figure 4:
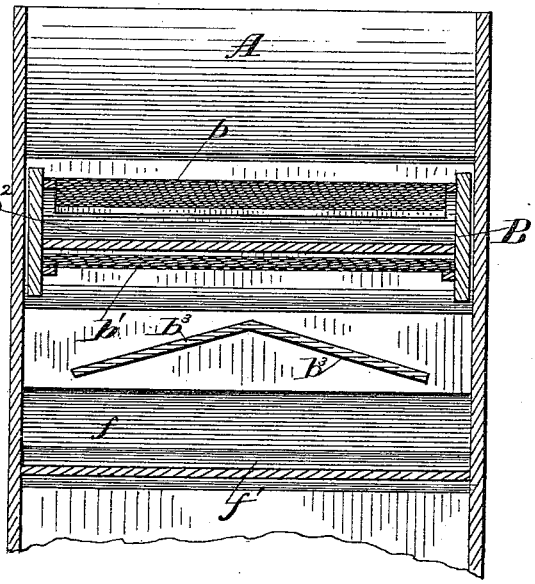
Figure 4:
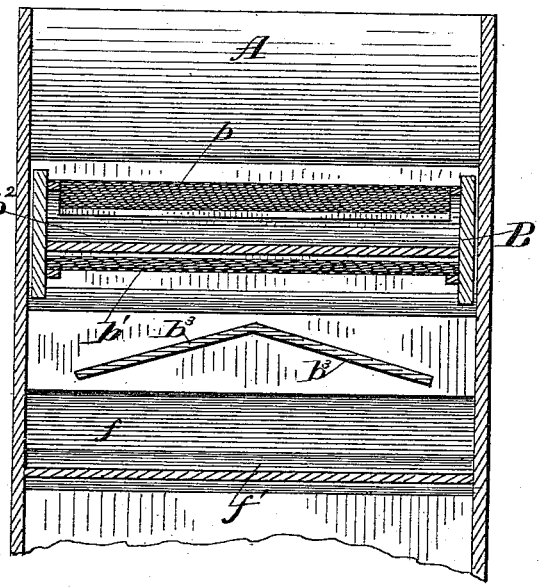

In the drawings, Figure 1 is a vertical longitudinal section of a fanning-mill embodying my invention. Fig. 2 is a like view showing a modified form of the same. Fig. 3 is a rear elevation of the shaking mechanism, and Fig. 4 is a transverse vertical section of the machine through the hopper and slanting shelf below.

A indicates the hopper from which the grain falls onto the shoe B. The upper sieve, $b$, of this shoe is inclined downward toward the front end of the mill, and is made with perforations that will permit the dust and small seed to pass through, the same being received on the oppositely-inclined dust-board $b^2$, and falling therefrom onto the slanting shelf $b^3$. The lower sieve, $b'$, made with perforations sufficiently large to allow for the passage of the grains of wheat, is set in the shoe on an incline parallel to that of the dust-board, and has its upper end extended slightly beyond the corresponding end of the sieve $b$, so as to be adapted to receive the wheat from the said sieve. As the wheat falls onto the front portion of the slanting shelf $b^3$, (that is, that portion of said shelf nearest the front end of the machine, shown at the left hand in Figs. 1 and 2,) it slides down on each side, and as it leaves its edges to fall onto the inclined board $f'$ it receives the draft coming through the passage $f$ from the fan F. This draft rids the grain of the dust that may have escaped with it, and this dust is carried with the bulk of the same that falls onto the rear portion of the slanting shelf $b^3$ (that is, that portion of said shelf nearest the rear end of the machine, shown at the right hand in Figs. 1 and 2, and hence nearest to the drum C) into the flues $c\ c$, one on each side of the mill. These flues open in the center of the drum C, instead of to one side of the center, as in my prior patent hereinbefore referred to, (which is in practice a marked improvement, as the suction is much more rapid and thorough in the present construction, and more even,) and the dust, being caught by the draft of the fan $C'$, is carried out through the spout $c'$, opening upward at the rear. From the inclined board $f'$ the grain falls onto the sieves of the shoe D. This shoe is provided with variously-inclined guides, as at $d$, to receive the sieves $d'\ d^2\ d^3$, or others, as may be required, according to circumstances. Close to the rear end of the shoe D are the rollers $d^4\ d^4$, which are journaled in the under edge thereof, on each side, and these rollers are adapted to run back and forth on top of the racked blocks or rails $d^5\ d^5$, fastened on the lower ends of the vertical bars $d^6\ d^6$, hanging between the shoe D and the sides $a\ a$ of the mill-frame. The upper portions of these vertical bars are toothed or racked, as shown, and mesh each with a pinion, $d^7$, that is keyed on each end of the shaft $D'$, journaled in suitable bearings fastened on the upper edges of the sides $a\ a$. This shaft, which serves to raise or lower the supporting racked blocks $d^5\ d^5$, so as to bring the shoe and sieves in the inclined position desired, is also provided with a pawl and ratchet, as at $d^8$, to secure the shoe in the position it has been brought to. $d^9\ d^9$ are grooved guides that are fastened onto the frame-sides, wherein the bars $d^6\ d^6$ are adapted to slide up or down when the shoe is being adjusted. As the shoe receives the usual longitudinal motion through the driving mechanism, (not shown,) it is given a series of sudden jerks by the blocks upon which its rollers run, whereby the shaking necessary to clear the sieves is effected in the best possible manner. E is the lower shoe, and this is designed for grading the grain, being provided with ways for various sieves. This shoe, as well as the upper shoe, B, is provided with substantially the same shaking device as described above for the shoe D. I dispense for these shoes, however, with the bars $d^6$ and the adjusting mechanism, the racked blocks B' and E' being respectively fastened in the mill-frame to support the rollers $b^4$ and $e$. As the grain falls out at the lower end of the lower shoe, E, it encounters another blast at $e'$ from the fan F, and by this blast the green grain and foreign matter which may not have been taken out is blown into the box $e^2$.

In Fig. 2 I have shown a mill without the fan F, in which case the fan $C'$ may be made larger, and the sieves of the shoe D are extended toward the front beyond the slanting shelf $b^3$, so as to directly receive the grain that falls from the same. The rest of the machine (not referred to by letter) is made in the usual manner, and its operation is too well known to need description here.

Having thus described my invention, what I claim as new, and desire to secure by Letters Patent, is—

1. The combination of the shoe B, having oppositely-inclined sieves $b\ b'$, dust-board $b^2$, slanting shelf $b^3$, suction-fan $C'$, flues $c\ c$, communicating with the shelf $b^3$ and dust-board $b^2$, blast-fan F, air-passage $f$, and shaking shoe D, having screens $d$, substantially as and for the purpose set forth.

2. In a fanning-mill, the combination of the shoe B, having oppositely-inclined sieves $b\ b'$, dust-board $b^2$, slanting shelf $b^3$, suction-fan $C'$, drum C, with spout $c'$, and flues $c\ c$, communicating with shelf $b^3$ and dust-board $b^2$, and extending to and opening into the center of said drum C on each side, whereby there is a double suction from the center of each side of the drum, substantially as and for the purpose set forth.

3. In a fanning-mill, in combination with the shaking shoe D, having rollers $d^4\ d^4$, the supporting-bars $d^6\ d^6$, each having the racked block or rail $d^5$ at its lower end and a rack on its upper portion, guides $d^9\ d^9$, the transverse shaft D′, having a pinion, $d^7$, keyed at each end, and a pawl and ratchet, $d^8$, substantially as and for the purpose set forth.

In testimony that I claim the foregoing I have hereunto set my hand, at Milwaukee, in the county of Milwaukee and State of Wisconsin, in the presence of two witnesses.

JACOB LUXEM.

Witnesses:
S. S. STOUT,
H. G. UNDERWOOD.